United States Patent [19]

Torres

[11] Patent Number: 5,365,360
[45] Date of Patent: Nov. 15, 1994

[54] METHOD AND APPARATUS FOR PRESENTING INFORMATION CONTAINED WITHIN A DATA ICON BY ASSIGNING ATTRIBUTES TO VARIOUS DIMENSIONS OF THE DATA ICON

[75] Inventor: Robert J. Torres, Colleyville, Tex.

[73] Assignee: International Business Machines Corporation, Armonk, N.Y.

[21] Appl. No.: 793,046

[22] Filed: Nov. 15, 1991

[51] Int. Cl.$^5$ ............................................. G06F 15/62
[52] U.S. Cl. ................................................... 395/159
[58] Field of Search ................................ 395/155–161, 395/113, 139, 153, 119, 120, 127; 364/705.08; 345/127, 131

[56] References Cited

U.S. PATENT DOCUMENTS

| | | | |
|---|---|---|---|
| 4,645,238 | 2/1987 | Vincent et al. | 364/705.08 |
| 4,714,918 | 12/1987 | Barker et al. | 395/157 |
| 4,803,155 | 2/1989 | Cree et al. | 395/161 |
| 4,807,154 | 2/1989 | Scully et al. | 395/161 |
| 4,817,018 | 3/1989 | Cree et al. | 395/155 |
| 4,819,191 | 4/1989 | Scully et al. | 395/161 |
| 4,831,552 | 5/1989 | Scully et al. | 395/153 |
| 4,881,179 | 11/1989 | Vincent | 395/113 |
| 4,937,743 | 6/1990 | Rassman et al. | 395/141 X |
| 5,001,697 | 3/1991 | Torres | 395/157 |
| 5,016,170 | 5/1991 | Pollalis et al. | 364/401 |
| 5,023,851 | 6/1991 | Murray et al. | 395/161 |
| 5,060,135 | 10/1991 | Levine et al. | 395/139 |
| 5,060,170 | 10/1991 | Bourgeois et al. | 395/157 |
| 5,129,057 | 7/1992 | Strope et al. | 395/161 |
| 5,148,154 | 9/1992 | MacKay et al. | 395/159 X |
| 5,261,045 | 11/1993 | Scully et al. | 395/161 |
| 5,276,801 | 1/1994 | Heyen et al. | 395/159 X |

OTHER PUBLICATIONS

Fujii et al., "Features and a Model for Icon Morphological Transformation", IEEE Workshop, Oct. 1991, pp. 240–245.
Tonomura et al., "Content Oriented Visual Interface Using Video Icons for Visual Database Systems", IEEE Workshop, Oct. 1989, pp. 68–73.
"Mail-Waiting Icon For PC-Based Office System", IBM Tech. Discl. Bull., Nov. 1989, pp. 173–174.
Cohen et al., "Automatic Strategies in the Siemens RTL Tiled Window Manager", IEEE Conf., Mar. 1988, pp. 111–119.
Cohen et al., "Constraint-Based Tiled Windows", IEEE Conf., Nov. 1984, pp. 2–11.
Collin, "Wave Hello in Style", PC User, Apr. 25, 1990, full text.
Lieberman, "A Three-Dimensional Representation For Program Execution", IEEE Workshop, Oct. 1989, pp. 111–116.
Najork et al., "The Cube Language", IEEE Workshop, Oct. 1991, pp. 218–224.
Henry et al., "Multidimensional Icons", ACM Trans. on Graphics, Jan. 1990, pp. 133–137.

Primary Examiner—Mark R. Powell
Assistant Examiner—John E. Breene
Attorney, Agent, or Firm—A. Bruce Clay

[57] ABSTRACT

A data icon comprises a hybrid of the advantages available with a conventional icon and a conventional window. The data icon has a minimized size and an enlarged size, both of which allow interactive entry of information. The enlarged data icon presents a format allowing the entry of information relating to an event similar to a conventional window. When minimized, the enlarged data icon is positioned in a selected location depending upon the information contained therein. The minimized data icon displays at least a portion of the information entered into the enlarged data icon. The data icon may be multi-dimensional to graphically illustrate various factors. For example, if the data icon indicates a meeting, a first dimension (vertical length) may represent duration of the meeting, a second dimension (horizontal width) may represent importance of the meeting, a third dimension (depth) may represent the number of attendees, and a fourth dimension may represent the subject of the meeting.

2 Claims, 11 Drawing Sheets

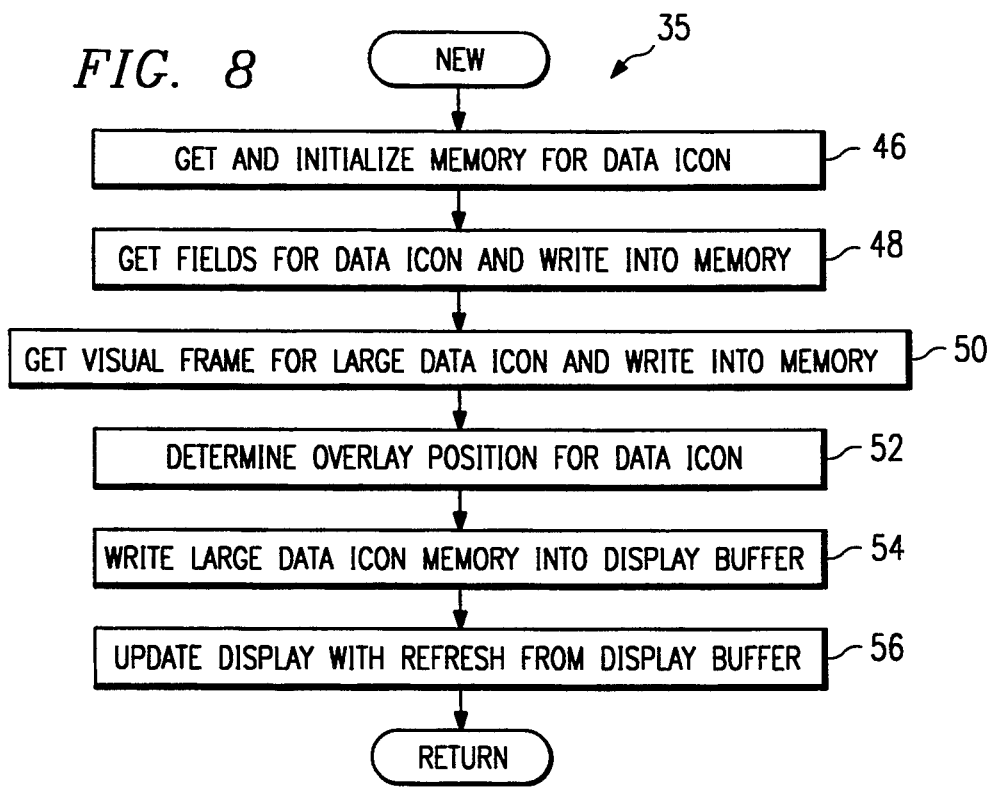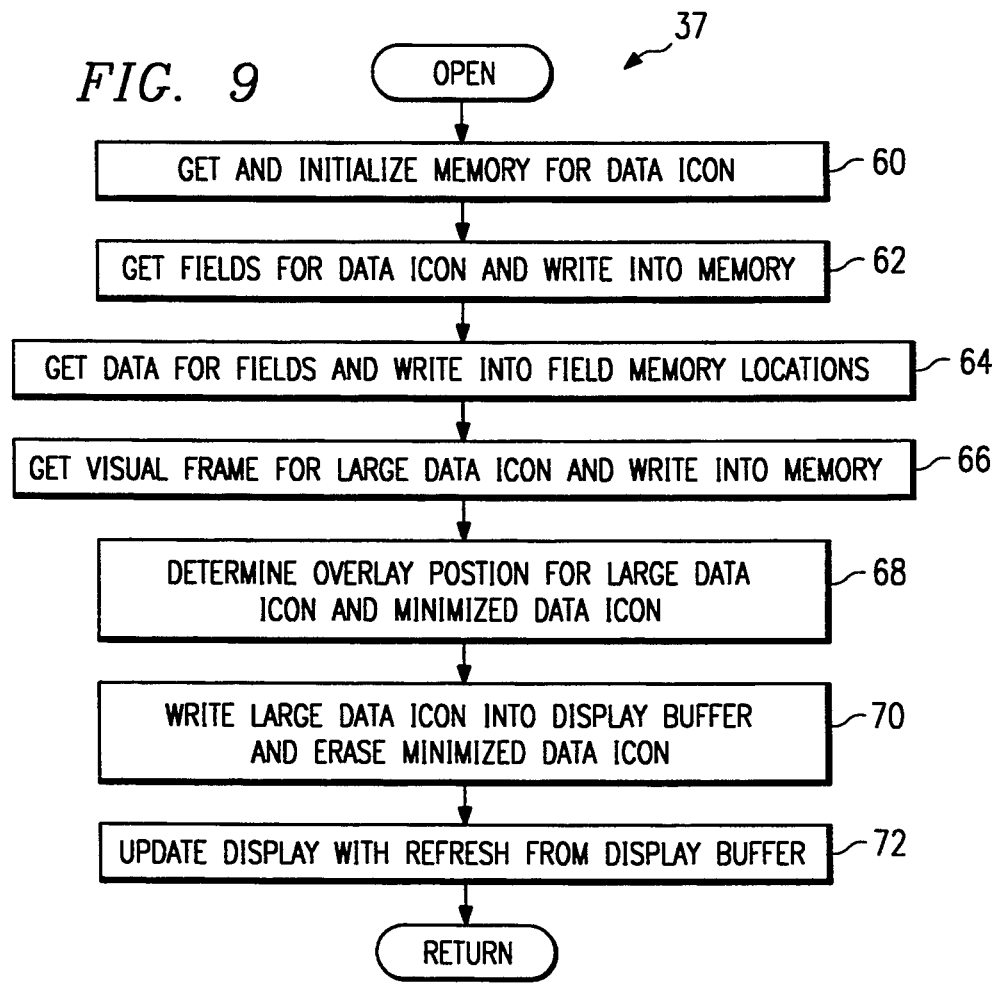

METHOD AND APPARATUS FOR PRESENTING INFORMATION CONTAINED WITHIN A DATA ICON BY ASSIGNING ATTRIBUTES TO VARIOUS DIMENSIONS OF THE DATA ICON

CROSS-REFERENCE TO RELATED APPLICATIONS

This application is related in subject matter to the following application filed concurrently herewith and assigned to a common assignee:

Application Ser. No.07/792,984, filed Nov. 15, 1991, by R. J. Torres and D. J. Kahl entitled Method and Apparatus Combining Functions of Icons and Windows to Form a Data Icon.

The foregoing copending application is incorporated herein by reference.

TECHNICAL FIELD OF THE INVENTION

This invention relates in general to graphical user interface systems, and in particular to a method and apparatus which allows direct entry of data into, and editing of data in a multi-dimensional hybrid icon/window without the necessity of switching in and out of standard windows and icons.

BACKGROUND OF THE INVENTION

Conventional graphical user interface systems provide icons which may be graphical representations of windows which have been taken from their operating state to some minimized view giving a minimum of identification data only, i.e. enough information so the operator knows what the window would be if selected. Preferably, icons are representations or pictures that suggest what the window is or what the window does. When opened, the icon enlarges or zooms to a conventional window with action bars, title bars, other icons and application data. Users cannot enlarge icons to an intermediate size to allow interaction with application data or information. Thus, for many simple operations, users are forced to deal with the full complexity of graphical interfaces. Additionally, when the window is closed, it is shrunk down, or tokenized, to an icon, generally positioned at the bottom of a screen, and the information entered into the window is not visible.

From the above, an icon may represent a window. When the icon is selected and a window is caused to be opened, information may be entered into the window. The operator must first select the icon to open the window and then select an action within the window such as, for example: add an event. Upon selection of the action, another window appears to allow the operator to fill in the new event information. Subsequently, the operator initiates the command to store the new information which allows the new information to be integrated into any information previously entered. The operator must then close the second window into which information was added, and, finally, close the first window which allowed the selection of a window for the adding of information. Thereafter, the operator would be returned to the screen from which the original icon was activated and the updated information would again be available for viewing by the operator only when the icon is again selected and a window is opened.

Thus conventional icon/window usage requires numerous operator steps to enter information and to be able to view and review the information. Additionally, conventional icon/window technology results in the opening of a full window upon selection for opening of an icon. It currently is not possible to enter information into an icon and, therefore, both time and screen space is wasted. Also, there is no utilization of multiple dimensions to visually indicate various factors. Thus, there is a need for a method and apparatus to allow direct user interaction with information contained in icons that utilize various dimensions to indicate different factors.

SUMMARY OF THE INVENTION

The invention disclosed herein comprises a method and apparatus for utilizing multi-dimensional hybrid icons/windows which substantially eliminates or reduces the problems of using both standard windows and standard icons. The method and apparatus described herein allows direct user interaction with information contained in the hybrid icons/windows, and provides visual indications of various factors by changing dimensions of the icon/window in response to the information entered therein.

In accordance with one aspect of the present invention, a method for depicting various factors with dimensions of a data icon is provided. The method utilizes at least a first and second dimension to depict first and second factors. In further aspects of the present invention third and fourth dimensions are utilized to represent third and fourth factors.

In one example, the first dimension comprises vertical screen length of the data icon, while the second dimension comprises horizontal screen width. The first dimension may be used to represent duration of a meeting, and the second dimension may be used to represent priority or importance of the meeting.

In another example of the present invention, the third dimension comprises a simulated screen depth, and the fourth dimension comprises a graphical depiction within the data icon. The third dimension may be used to represent the number of attendees at the meeting, and the fourth dimension may represent any other desired factor.

The present invention has the technical advantage of allowing direct user interaction with information contained in icons. The present invention has the further advantage of saving operator and computer time by simplifying the steps necessary to enter and/or edit information. The present invention has the still further advantage of reducing the amount of space which is required for use on a screen during information entry. The present invention has the still further advantage of providing visual indication of various factors that would otherwise require textual explanation.

BRIEF DESCRIPTION OF THE DRAWINGS

For a more complete understanding of the present invention and the advantages thereof, reference is now made to the Detailed Description in conjunction with the attached Drawings, in which:

FIG. 8 is a flow chart of the NEW sub-routine of FIG. 7;

FIG. 9 is a flow chart of the OPEN sub-routine of FIG. 7;

DETAILED DESCRIPTION OF THE INVENTION

Figure 1:
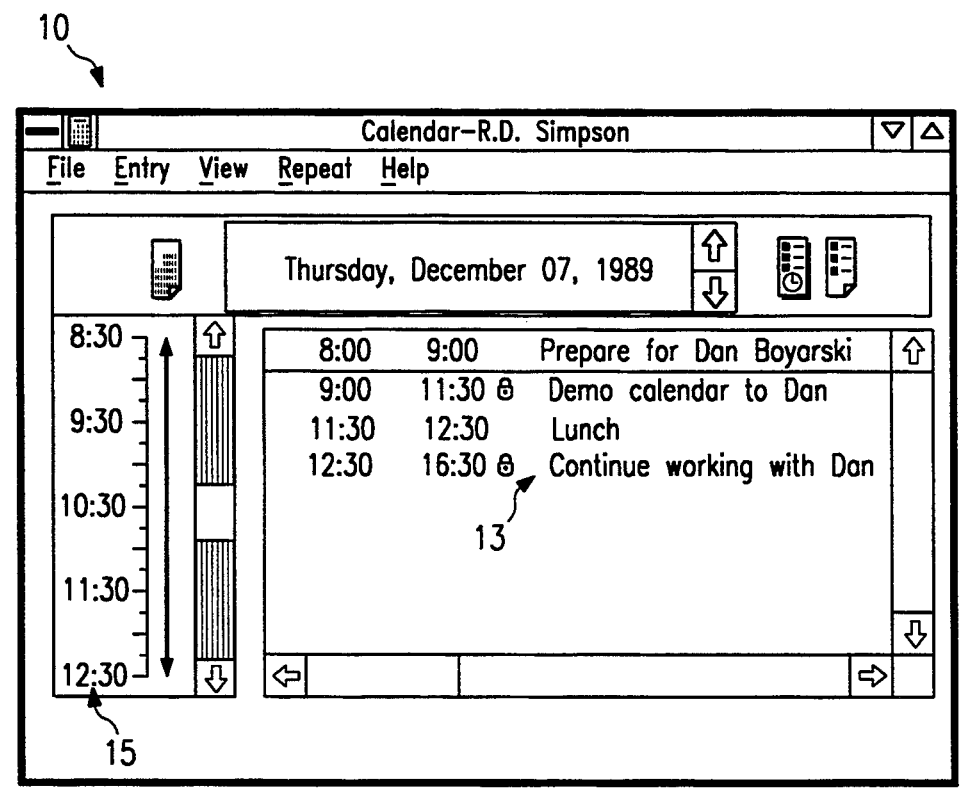
FIG. 1 illustrates a calendar in accordance with the prior art.
Figure 2:
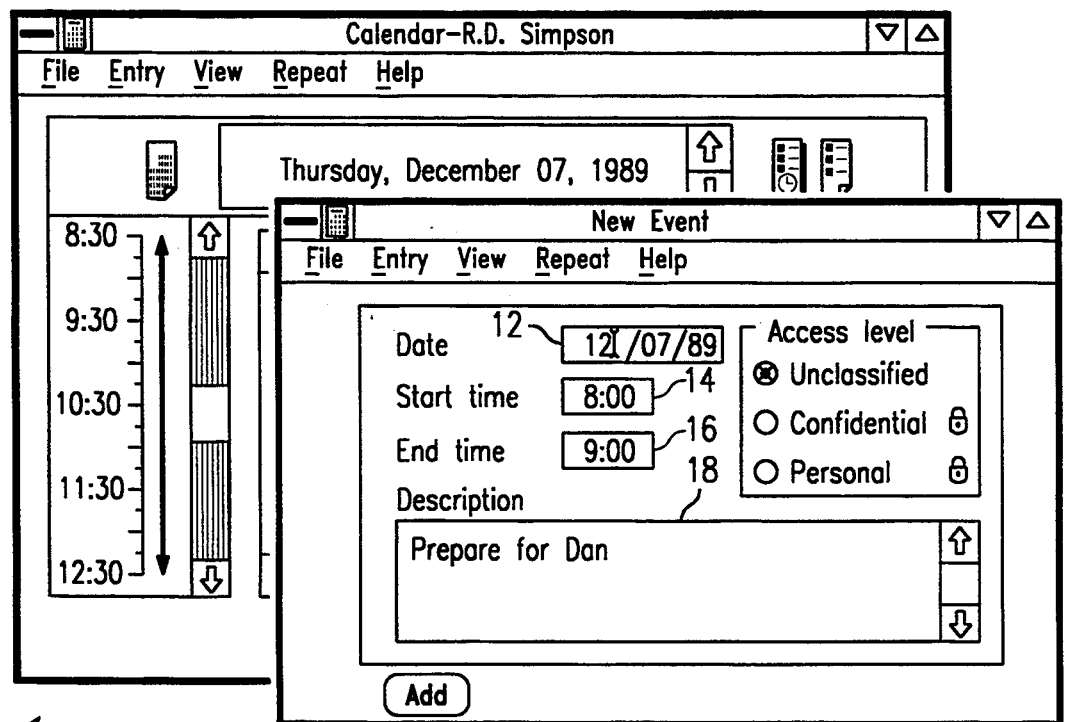
FIG. 2 illustrates a window over the calendar of FIG. 1.

Referring first to FIG. 1, an example of a conventional calendar window is generally identified by the reference numeral 10. The window 10 provides information about the daily schedule of an individual listing events in textual form. To enter data onto the window 10, a second window generally identified by the reference numeral 11, see FIG. 2, must be opened. The information is then typed into the appropriate fields, such as date 12, start time 14, end time 16, and description 18, by an operator. As used herein, "operator" is defined as a person who uses a computer program installed in a computer system. The term "user" may be used interchangeably herein to mean the same as an "operator". Once the information is entered into the window 11, the window 11 is shrunk down or tokenized back into the icon (not shown) from which it originated thus allowing viewing of information entered in the window 10 (FIG. 2). Once the window 11 is selected for the entry of new information, the information previously displayed in the window 10 is obscured. Additionally, the information entered into the window 10 via the window 11 can be seen to have little correlation to the arrangement of information in the window 10. For example, a line of information 13 indicating a time frame of 12:30–16:30 does not match with the corresponding time frame on a time bar 15.

Figure 3:
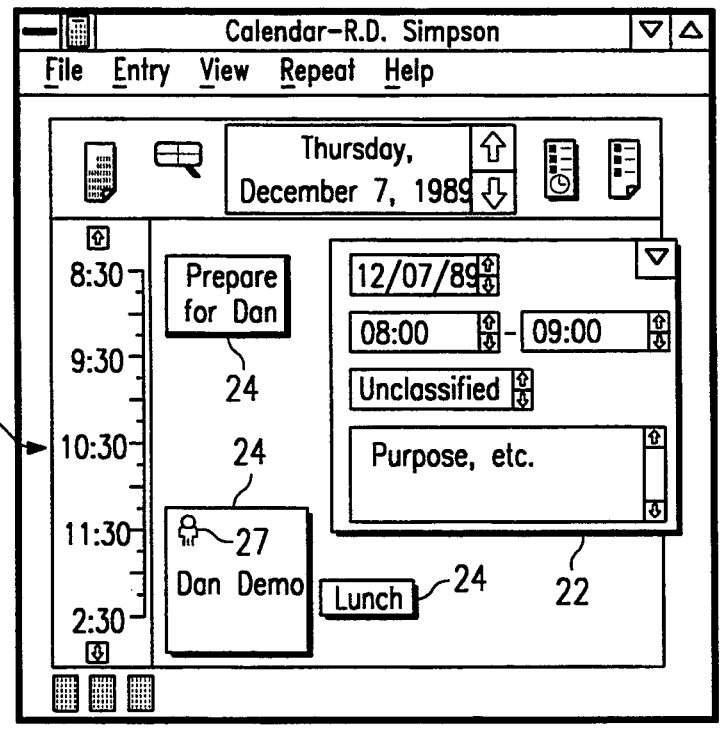
FIG. 3 illustrates a calendar utilizing data icons.

Referring next to FIG. 3, a window incorporating data icons in accordance with the present invention, is generally indicated by the reference numeral 20. A data icon as used herein is a mixture or hybrid of the advantages available from the use of conventional icons and conventional windows. The window 20 includes examples of an enlarged data icon 22 and minimized data icons 24. The enlarged data icon 22 allows display of interactive information such as data entry fields, lists and other controls plus direct manipulation move, borders, copying, and etc. The minimized data icons 24 display a subset of the interactive information from the enlarged data icon 22.

Figure 4:
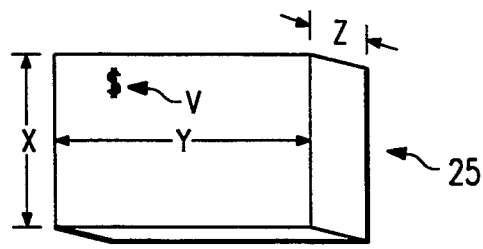
FIG. 4 illustrates the multi-dimensions of the data icons in accordance with the present invention.

The minimized data icons 24 may be sized by the amount of information therein, by the time frame to which they refer, duration, priority and etc. For example, the data icons 24 shown in FIG. 3 indicate a brief amount of information as to the entire contents thereof as well as the time frame to which they pertain. Referring to FIG. 4, a data icon 25 is shown which allows a plurality of dimensions for indication of various factors. For example, a first dimension X (vertical screen length) may represent time or length of a meeting, a second dimension Y (horizontal screen width) may represent priority or importance of the meeting, a third dimension Z (screen depth) may represent the number of attendees at the meeting and a fourth dimension V may represent a graphical depiction of the general subject matter of the meeting.

The minimized data icons 24 are sized only by the dimension X (FIG. 3) to indicate time or duration of the particular event depicted therein. Additionally, it is readily apparent from the arrangement of the data icons 24 when there is a scheduling overlap or conflict. By the positioning of a fourth dimension V within the data icons 24, such as, for example, a stick FIG. 27, particular information about the event (number of attendees) can be graphically illustrated. Although not shown, it is to be understood that dimension V can be an animation as well as a fixed figure.

Figure 5:
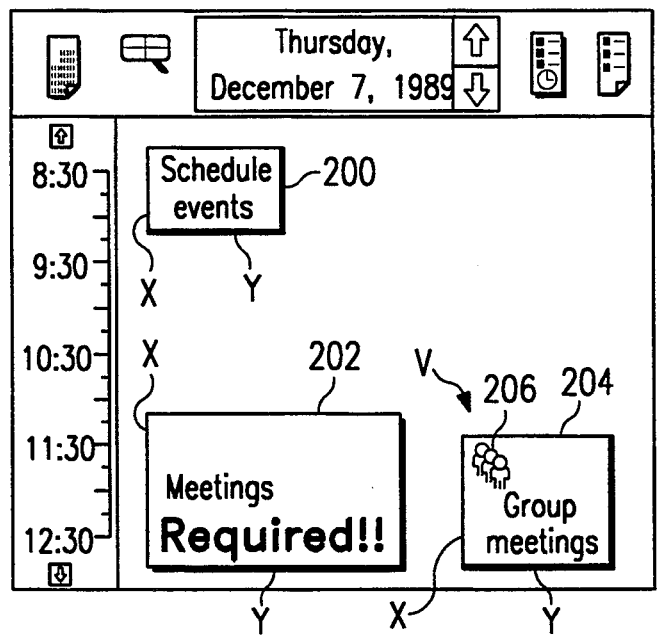
FIG. 5 illustrates a calendar utilizing multi-dimensional data icons in accordance with the present invention.

Referring next to FIG. 5, further examples of multi-dimensional data icons are identified by the reference numerals 200, 202, and 204. By comparing the data icon 200 with the data icon 202, the use of two dimensions for two separate factors is displayed. The data icon 200 uses the dimension X to depict duration of the event (Schedule events) and the dimension Y to depict a normal priority. The data icon 202 also uses the dimension X to depict duration of the event (a meeting), however, the dimension Y is increased to depict a greater priority than that of the data icon 200 event. The data icon 204 demonstrates the use of the dimension X (duration), the dimension Y (normal priority) and the dimension V in which the stick figures 206 may depict the number of attendees.

Figure 6:
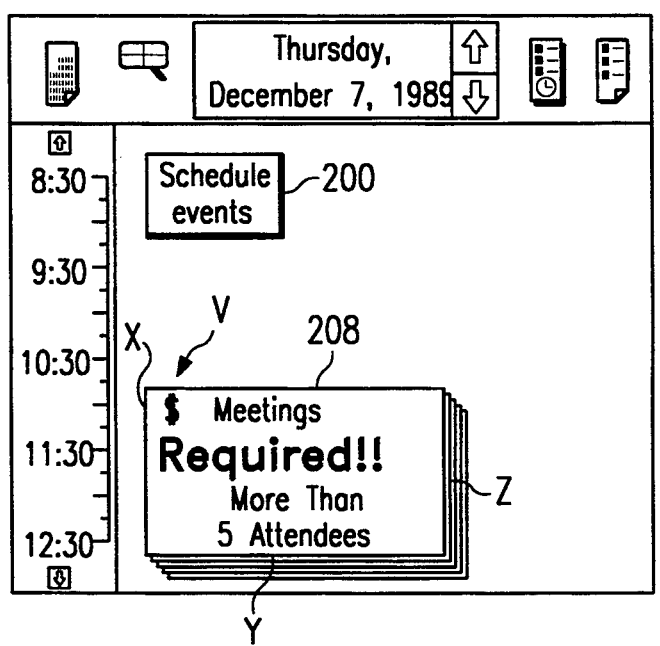
FIG. 6 illustrates another example of multi-dimensional data icons.

Referring next to FIG. 6, a still further example of a multi-dimensional data icon is identified by the reference numeral 208. The same data icon 200 as is described above is also included for comparative reference. The data icon 208 utilizes four dimensions to graphically depict four separate factors. The dimension X depicts duration while the dimension Y depicts priority. In addition, the dimension Z is used to depict a range of the number of attendees (for example, more than 5 persons). The dimension V (a dollar sign) is added within the data icon 208 to depict, for example, the subject of the meeting, i.e. financial status. Although not shown, it is to be understood that additional dimensions could be included with the data icons as disclosed herein to depict other factors. The following Table I displays a comparison of conventional window, a conventional icon and a data icon.

TABLE 1

| FEATURE | WINDOW | ICON | DATA ICON |
|---|---|---|---|
| Data | display and interact | cannot see data and under normal operating conditions cannot interact w/ data | display and interact |
| Position | user controlled | user controlled | user or data controlled |

TABLE 1-continued

| FEATURE | WINDOW | ICON | DATA ICON |
|---|---|---|---|
| Represents | window onto a data object | minimized representation of the data object | data object |
| Change data | show changed data | cannot see data | see changed data and may change location and size |
| Open | opened by activating the icon | to standard size window | to enlarged icon size |
| Size | drag borders to change size | cannot size | drag borders and change data in the enlarged icon |
| Drag (move) | change location has no effect on data | change location has no effect on data | change location changes data |
| Minimize (close) | standard placement and static size | N/A | data driven placement and size |

It can be seen by comparing the various features listed, that the data icon is a hybrid of the features available with conventional windows and conventional icons, as well as improvements thereover. For example, referring to the Change Data feature, it is demonstrated that by changing information in a conventional window, no information can be seen in the related conventional icon. In contrast, by changing information in the data icon, the information is available for viewing directly (either enlarged or minimized data icons). In addition, the entry of new information may change the location and size of the data icon. For example, referring again to FIG. 3, changing the information in one of the minimized data icons 24 (such as the time for start and duration of the event) will change the location of the data icon 24 relative to a time bar 29 as well as changing the length of the dimension X (FIG. 4) thereof.

By providing the various dimensions which may be selected for the data icons, a graphical depiction of various factors is provided. Such graphical depictions display a more easily understandable symbol to a user than if the same information were provided textually.

Figure 7:
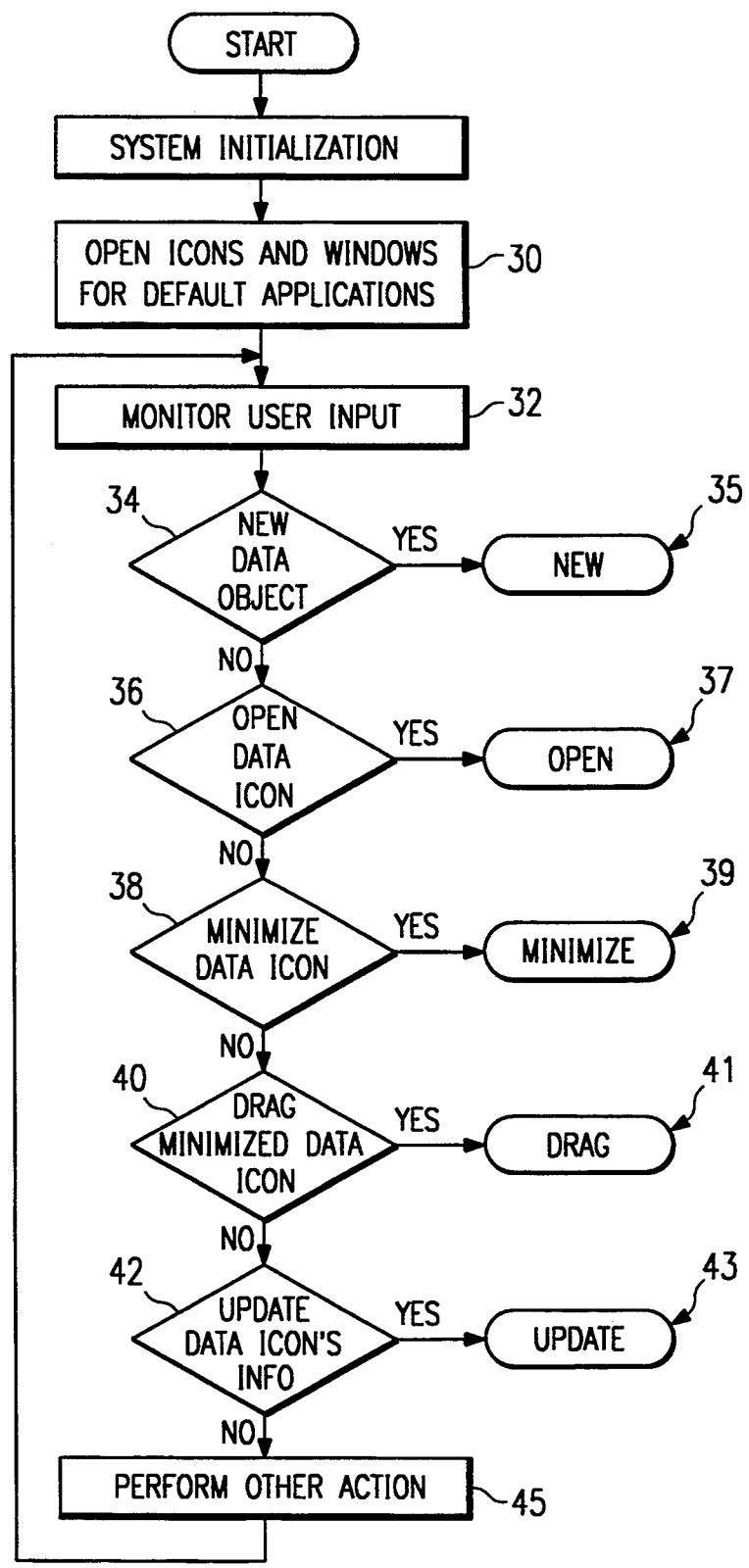
FIG. 7 is a flow chart for data icons.

Referring next to FIGS. 7 through 17, flowcharts for the data icon are provided. FIGS. 7-12 are for the data icon as disclosed in co-pending U. S. patent application Ser. No. 07/792,894, filed Nov. 15, 1991, while FIGS. 13-17 deal specifically with the inventive concept herein, i.e., the multi-dimensional data icon. As shown in FIG. 7 at block 30, after system initialization, icons and windows are opened for default applications, i.e. whatever the standard opening screen produces. At block 32, the system is waiting for user instructions. The user instructions are: new data object in decision block 34, open data icon in decision block 36, minimize data icon in decision block 38, drag minimized data icon in decision block 40, update data icon's information in decision block 42 or perform other actions at block 45.

In decision block 34, if a new data object is to be created, a NEW sub-routine 35 is called. The NEW sub-routine 35 allows the entry of new information into a data icon, for example, such as shown in the enlarged data icon 22 in FIG. 3. Referring to FIG. 8, the NEW sub-routine 35 is illustrated in more detail. At block 46, memory for the data icon is obtained and initialized. At block 48, the fields for the data icon are obtained and written into memory. The visual frame for the enlarged data icon is obtained and written into memory at block 50. The overlay position for the data icon is then determined at block 52. Memory for the enlarged data icon is written into a display buffer at block 54 and the display is updated with refresh from the display buffer at block 56. The NEW sub-routine 35 then returns to block 32 (see FIG. 7).

If it is desired to open a minimized data icon to an enlarged data icon, decision block 36 is chosen. The OPEN sub-routine as identified by the reference numeral 37 is called. Referring to FIG. 9, the OPEN sub-routine 37 is illustrated in more detail. As with the NEW sub-routine 35, the OPEN sub-routine 37 first obtains and initializes memory for the data icon at block 60 and obtains and writes the fields for the data icon into memory at block 62. Then, at block 64, data for the fields is obtained and written into the field memory locations. The visual frame for the enlarged data icon is obtained and written into memory. The overlay position for the enlarged data icon and the minimized data icon is determined at block 68. The enlarged data icon is written into the display buffer and the minimized data icon is erased at block 70. The display is then updated with refresh from the display buffer at block 72. The OPEN sub-routine 37 then returns to block 32 (see FIG. 7).

Figure 10:
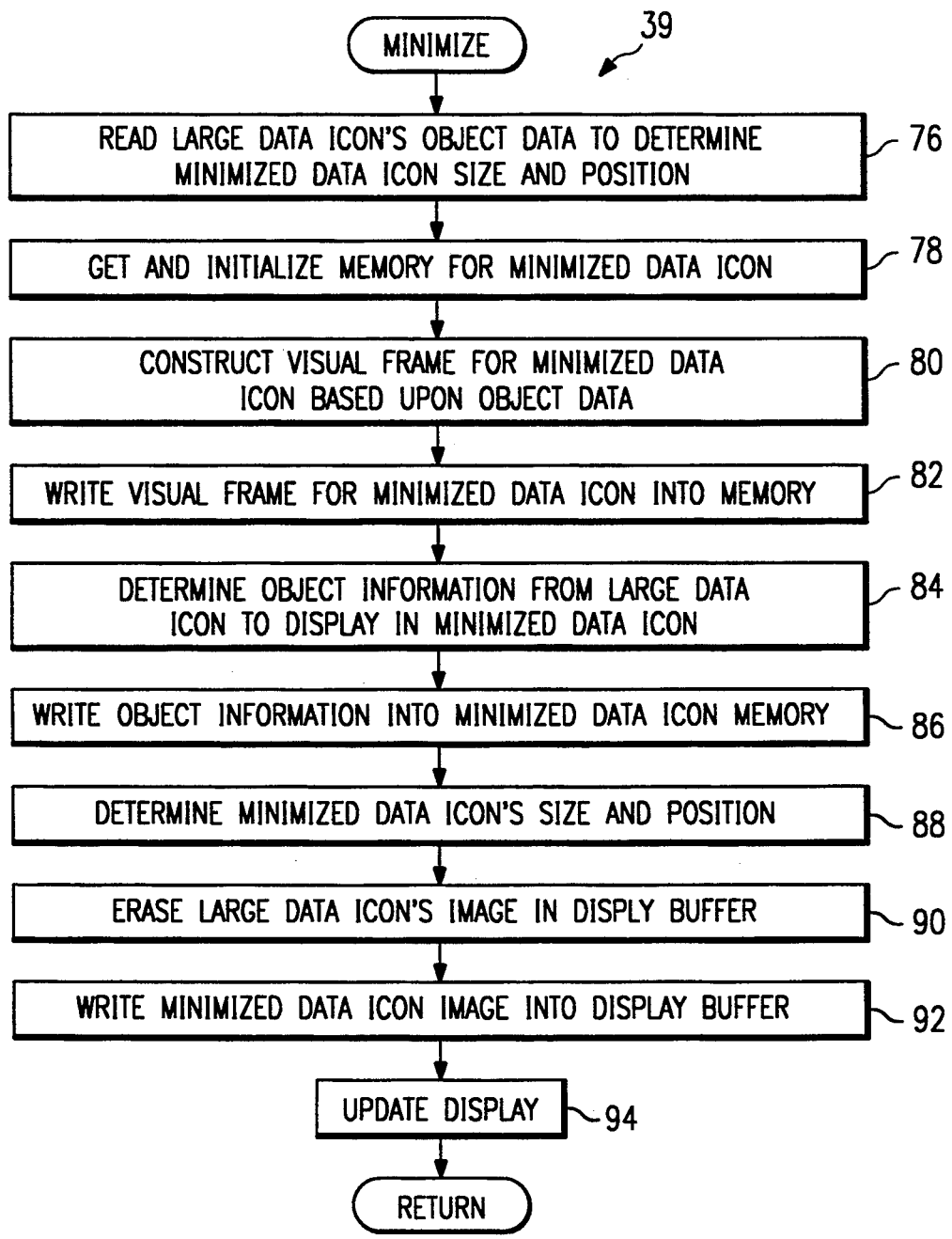
FIG. 10 is a flow chart of the MINIMIZE sub-routine of FIG. 7.

If it is desired to minimize an enlarged data icon at decision block 38, the MINIMIZE sub-routine as identified the reference numeral 39, is called. Referring to FIG. 10, the MINIMIZE sub-routine 39 is illustrated in more detail. In the MINIMIZE sub-routine 39, the enlarged data icon's object data is read to determine the required size and position for the minimized data icon at block 76. The memory for the minimized data icon is obtained and initialized at block 78 after which the visual frame is constructed for the minimized data icon based upon the object data at block 80. The visual frame for the minimized data icon is written into memory at block 82. At block 84, the object information for display in the minimized data icon from the large data icon is determined. The object information is then written into the minimized data icon memory at block 86 followed by a determination of the minimized data icon's size and position. The enlarged data icon's image is erased from the display buffer at block 90, and the minimized data icon's image is written into the display buffer at block 92. The display is then updated with the minimized data icon at block 94. The sub-routine 39 then returns to block 32 (see FIG. 7).

Figures 11, 12:
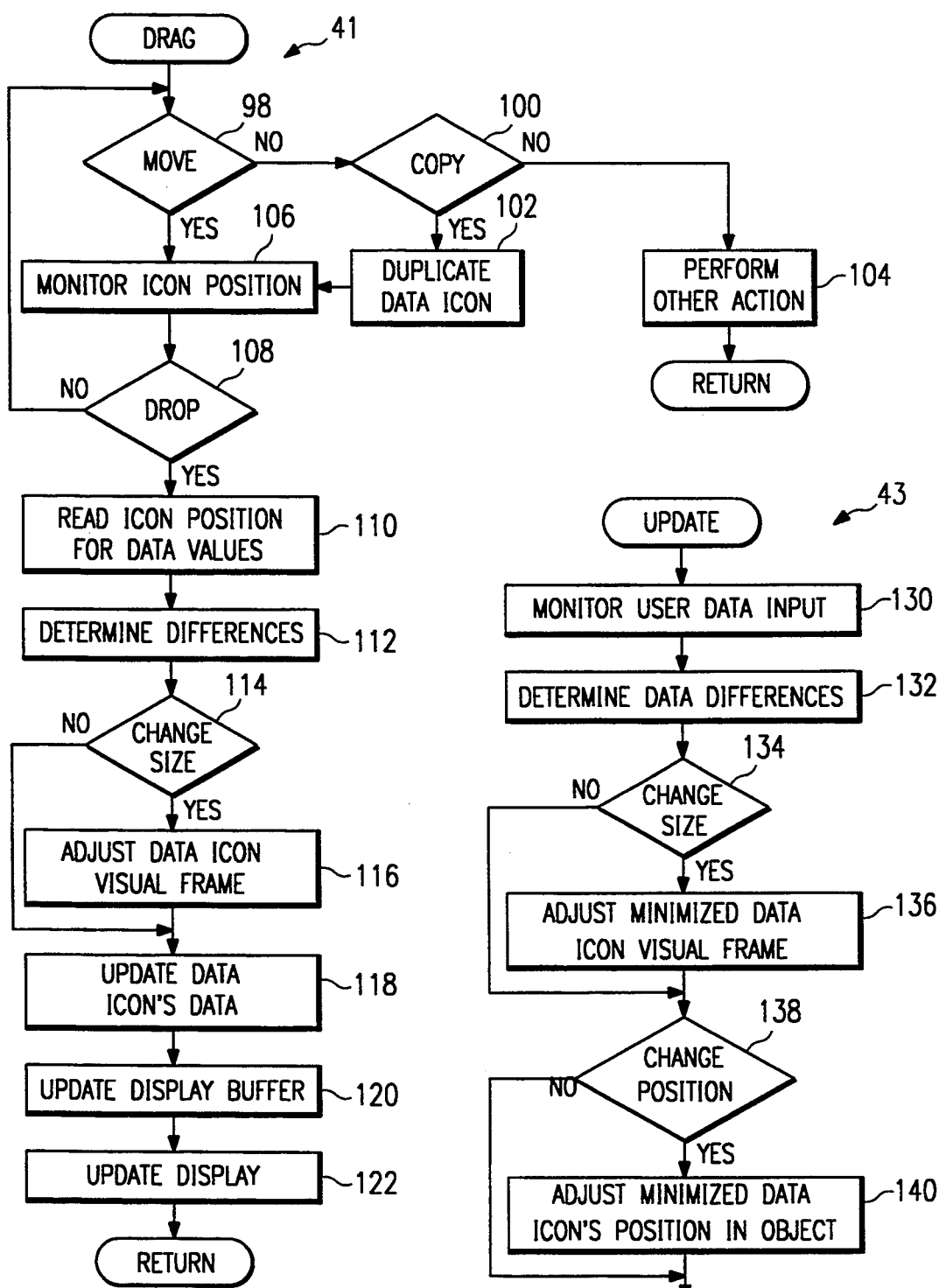
FIG. 11 is a flow chart of the DRAG sub-routine of FIG. 7.
FIG. 12 is a flow chart of the UPDATE sub-routine of FIG. 7.

If it is desired to drag the minimized data icon, decision block 40 is selected. The DRAG sub-routine, as identified by the reference numeral 41, is called. Referring to FIG. 11, the DRAG sub-routine 41 is illustrated in more detail. In the DRAG sub-routine 41, the data icon may be moved at decision block 98, copied at decision block 100 or some other action performed at block 104. The other actions at block 104, may comprise, for example, creating a link between two events, as is known in the art, and then allows the operation to return to block 32. If copy at decision block 100 is to be performed, the data icon is duplicated at block 102. After move at block 98 or after duplication at block 102, the icon position is monitored at block 106. The icon is dropped at decision block 108 or returned to decision block 98. If the icon is dropped, the icon position is read for data values at block 110. Any differences in data values are determined at block 112 and if a change in size is required at decision block 114, the data icons visual frame is adjusted at block 116. If no change in size at decision block 114 is required or after block 116, the data icon's data is updated at block 110. The display buffer is updated at block 120 followed by updating the display at block 122. The sub-routine 41 then returns to block 32 (see FIG. 7).

If it is desired to update either the enlarged or the minimized data icon, decision block 42 is selected. The UPDATE sub-routine, as identified by the reference numeral 43, is called. The UPDATE sub-routine 43 is illustrated in more detail in FIG. 12. In the UPDATE sub-routine 43, the user input is monitored at block 130. Any differences between the information already stored and the new information is determined at block 132. At decision block 134, it is determined whether any difference in the information requires a change in data icon size. If a change in size is required, the minimized data icon visual frame is adjusted at block 136 followed by the change in position at block 138. If no change in size is required at block 134, block 136 is bypassed to the change position decision block 138. If a change in position at block 138 is required, the minimized data icon's position is adjusted in object at block 140 followed by an update of the display buffer at block 142. If no position change at block 138 is required, block 140 is bypassed to the update display buffer at block 142. The updated information is then displayed at block 144. The sub-routine returns to block 32 (see FIG. 7).

Figure 13:
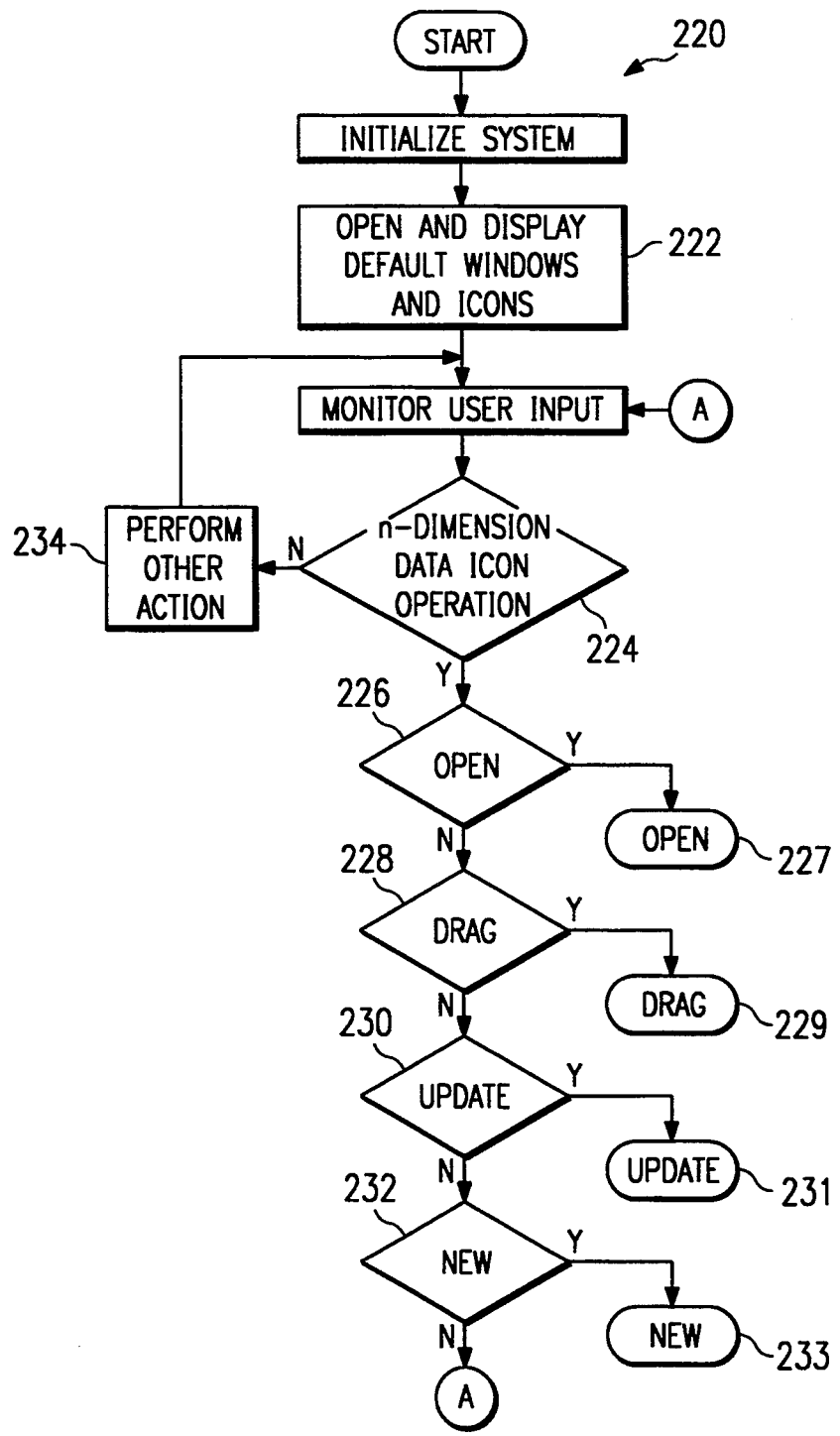
FIG. 13 is a flow chart of the present invention.
Figure 14:
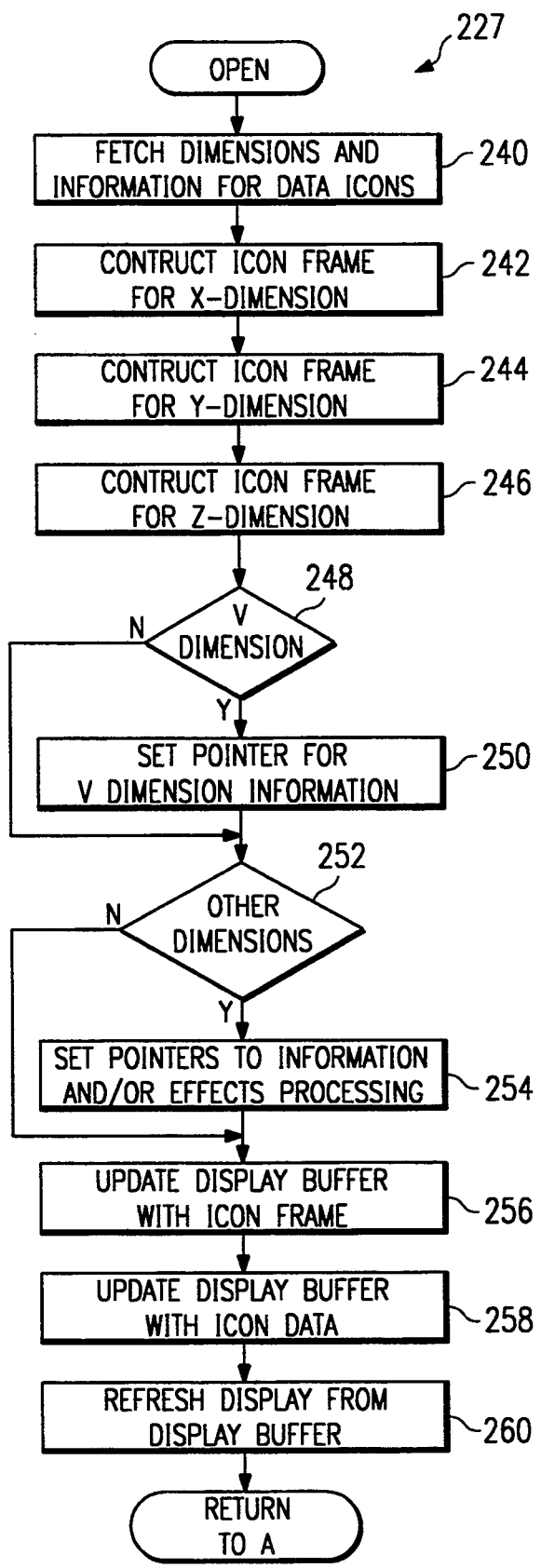
FIG. 14 is a flow chart of the OPEN sub-routine of FIG. 13.
Figure 15:
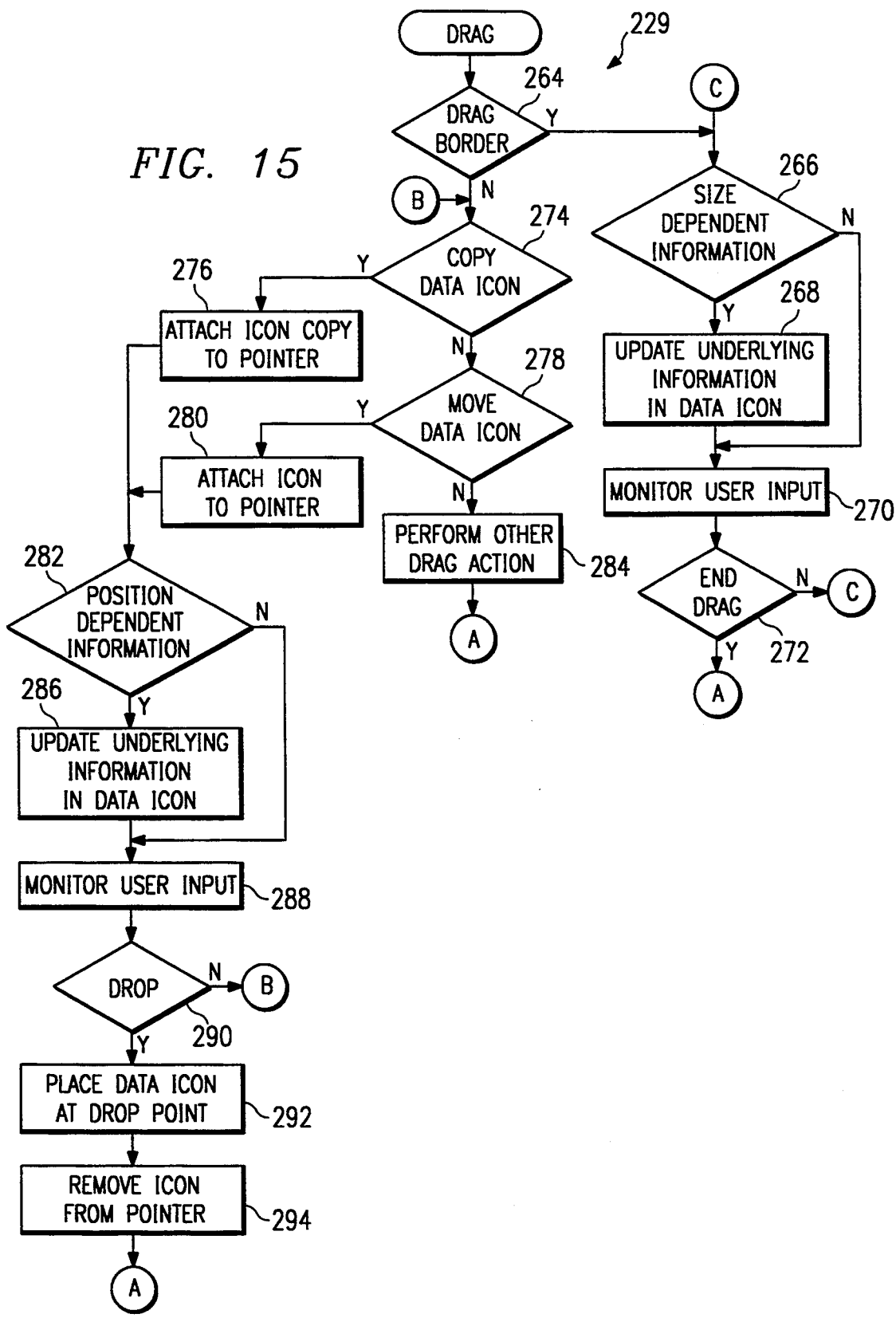
FIG. 15 is a flow chart of the DRAG sub-routine of FIG. 13.
Figures 16, 17:
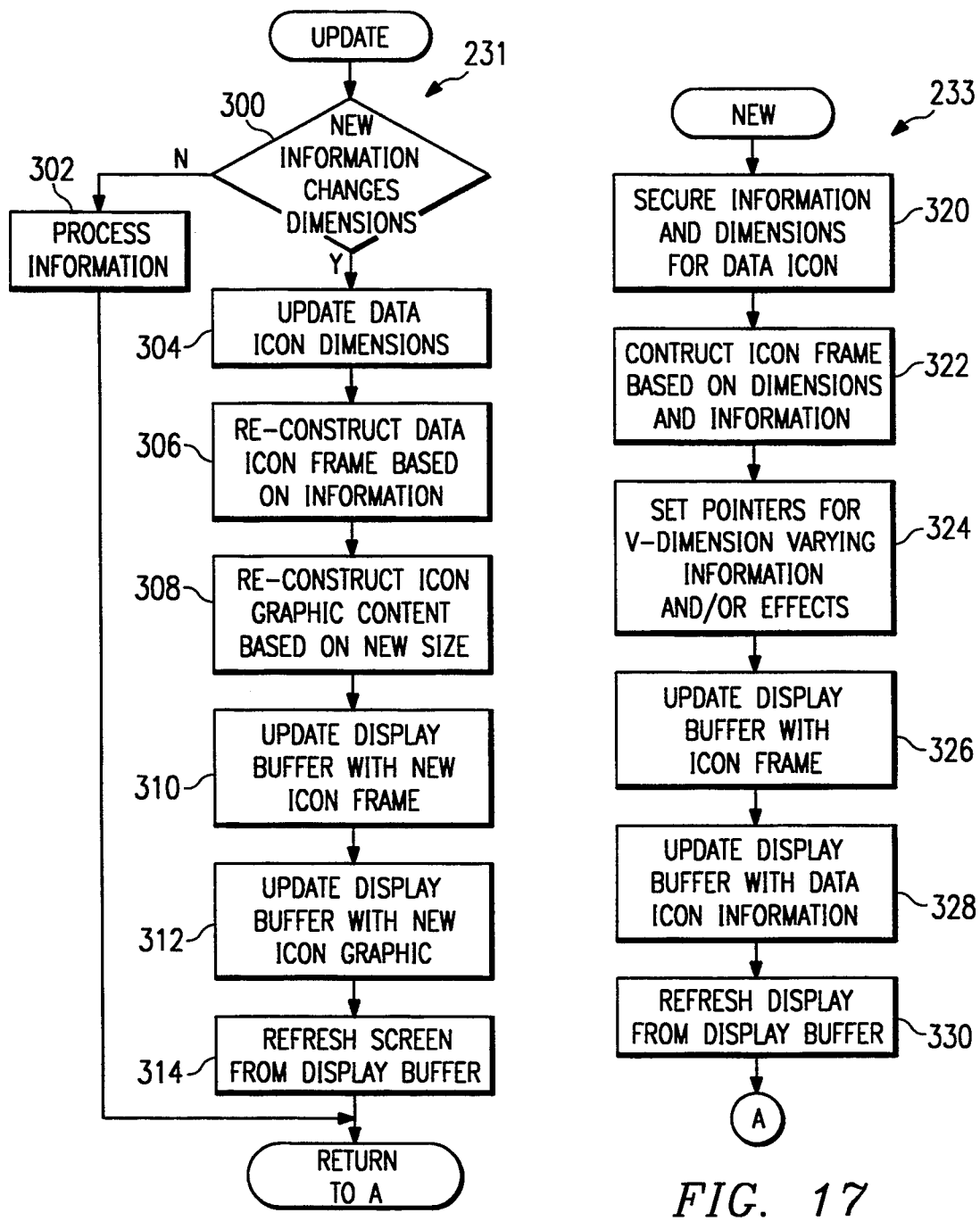
FIG. 16 is a flow chart of the UPDATE sub-routine of FIG. 13.
FIG. 17 is a flow chart of the NEW sub-routine of FIG. 13.

Referring now to FIGS. 13-17, the flowcharts specifically describing the multi-dimensional icon of the present invention are discussed in greater detail. Referring first to FIG. 13, a flowchart generally identified by the reference numeral 220 illustrates the multi-dimensional data icon operation in accordance with the present invention. After system initialization, default windows and icons are opened and displayed at block 222. At block A, the system is waiting for user instructions. If at decision block 224, a multi-dimensional data icon operation is to occur, one of the following occurs: OPEN at decision block 226, DRAG at decision block 228, UPDATE at decision block 230 or NEW at decision block 232. If a multi-dimensional data icon operation does not occur, another action such as, for example, new data object at decision block 34 (see FIG. 7) may be performed at block 234 followed by a return to block A.

If a multi-dimensional data icon is to be opened at decision block 226, an OPEN sub-routine 227 is called. The OPEN sub-routine 227 is illustrated in greater detail in FIG. 14. In block 240, fetch dimensions and information for the data icon is performed. At block 242, the icon frame for the X dimension is constructed, followed by construction of the icon frame for the Y dimension at block 244 and construction of the icon frame for the Z dimension at block 246. At decision block 248, if a V dimension is utilized, the pointer is set for the information at block 250. If no V dimension is utilized at decision block 248, the sub-routine 227 proceeds to decision block 252 for other dimensions. If other dimensions are utilized at decision block 252, the pointer is set to information and/or effects processing at block 254. If other dimensions are not utilized at decision block 252, the sub-routine 227 proceeds to update the display buffer with the icon frame at block 256. The display buffer is updated with icon information at block 258 followed by a refresh from the display buffer at block 260. The sub-routine 227 may then return to block A (monitor user input) at FIG. 13.

If a drag at decision block 228 is to be performed, the DRAG sub-routine 229 is called. The DRAG sub-routine 229 is illustrated in greater detail in FIG. 15. At decision block 264 it is determined whether the data icon borders are to be dragged. If drag borders is to be conducted at decision block 264, size dependent information is determined at decision block 266. If the response to decision block 266 is yes, an update of the underlying information in the data icon is conducted at block 268. If the size dependent information was not selected at decision block 266, the sub-routine 229 proceeds to monitor user input at block 270. At decision block 272, it is determined whether or not to end the drag. If end drag is yes, the sub-routine 229 returns to block A on FIG. 13. If the response to decision block 272 is no, the sub-routine 229 returns to C at decision block 266.

If the response to decision block 264 was no, the sub-routine 229 proceeds to copy the data icon at decision block 274. If the response to decision block 274 is yes, the sub-routine 229 proceeds to attach the icon copy to a pointer at block 276. If the response to decision block 274 was no, the sub-routine 229 proceeds to move the data icon at decision block 278. If the response to decision block 278 is yes, a pointer is attached to the data icon at block 280. From block 276 or block 280, sub-routine 229 proceeds to position the dependent information at decision block 282. If the response to decision block 278 was no, the sub-routine 229 proceeds to perform other drag action at block 284 followed by a return to block A in FIG. 13.

If the response to decision block 282 (position dependent information) is yes, the sub-routine 229 proceeds to update the underlying information in the data icon at block 286. Monitor user input then occurs at block 288. If the response to decision block 282 is no, the sub-routine 229 would proceed directly to monitor user input at block 288. After monitoring user input at block 288, the sub-routine 229 proceeds to a drop decision block 290. If the response to decision block 290 is no, the sub-routine 229 returns to B prior to decision block 274. If the response to decision block 290 is yes, the data icon is placed at a drop point at block 292. At block 294, the data icon is removed from the pointer followed by a return to block A at FIG. 13.

If an update of the data icon in decision block 230 is to be performed, an UPDATE sub-routine 231 is called. The UPDATE sub-routine 231 is shown in greater detail in FIG. 16. At decision block 300, it is determined whether any new information changes the dimensions of the data icon. If the response to decision block 300 is no, the sub-routine 231 proceeds to block 302 to process the information followed by a return to block A at FIG. 13. If the response to decision block 300 is yes, the data icon's dimensions are updated at block 304. At block 306, the data icon frame is reconstructed based on the new information. At block 308, the data icon graphic content is reconstructed based on the new size. The display buffer is updated with the new data icon frame at block 310 followed by an update of the display buffer with the new data icon graphic at block 312. At block 314, the screen is refreshed from the display buffer. The sub-routine 231 then returns to block A at FIG. 13.

If a new data icon at decision block 232 is to be performed, a NEW sub-routine 233 is called. The NEW sub-routine 233 is illustrated in greater detail in FIG. 17.

At block 320 new information and dimensions for the data icon are secured. At block 322, the data icon frame is constructed based on the dimensions and information. At block 324, the pointers are set for V dimension varying information and/or effects. The display buffer is updated with the data icon frame at block 326. The display buffer is then updated with the data icon information at block 328 followed by a refresh from the display buffer at block 330. The sub-routine 233 then returns to block A at FIG. 13.

Figure 18:
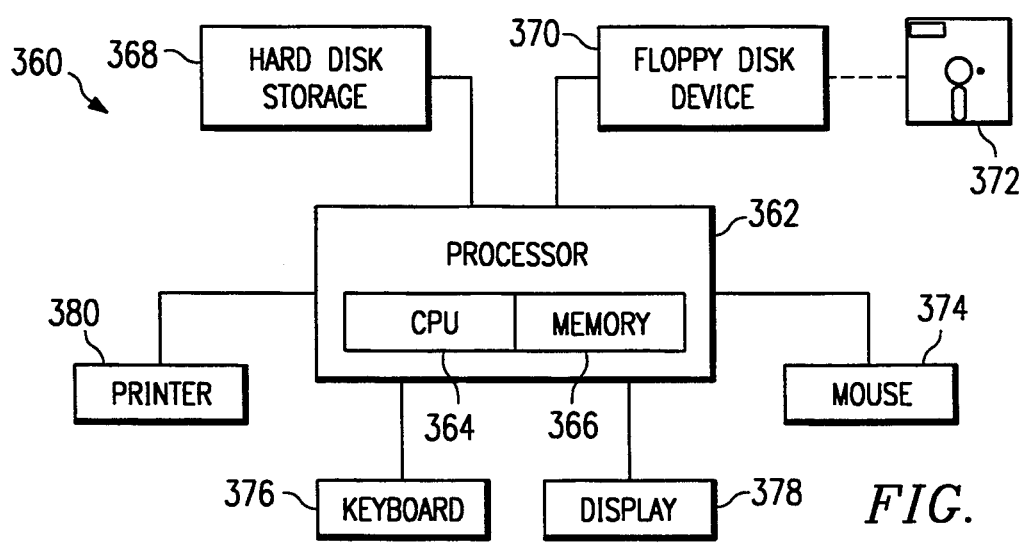
FIG. 18 is a schematic view of a data processing system in accordance with the present invention.

Referring now to FIG. 18, there is shown, in block diagram form, a data processing system generally identified by the reference numeral 360 according to the present invention. The system 360 includes a processor 362, which includes a central processing unit (CPU) 364 and a memory 366. Additional memory, in the form of a hard disk storage 368 and a floppy disk device 370, is connected to the processor 362. The floppy disk device 370 receives a floppy disk 372 which has computer program code recorded therein that implements the present invention in the system 360. The system 360 includes user interface hardware, including a mouse 374 and keyboard 376 for allowing user input to the processor 362 and a display 378 for presenting visual data to the user. The system 360 may also include a printer 380.

In summary, the invention disclosed herein comprises a method and apparatus for utilizing multi-dimensional hybrid icons/windows which substantially eliminates or reduces the problems of using both standard windows and standard icons. The method and apparatus described herein allows direct user interaction with information contained in the hybrid icons/windows, and provides visual indications of various factors by changing dimensions of the icon/window in response to the information entered therein.

In accordance with one aspect of the present invention, a method for depicting various aspects with multi-dimensions of a data icon is provided. The method utilizes at least a first and second dimension to depict first and second factors. In further aspects of the present invention third and fourth dimensions are utilized to represent third and fourth factors.

In one example, the first dimension comprises vertical screen length of the data icon, while the second dimension comprises horizontal screen width. The first dimension may be used to represent duration of a meeting, and the second dimension may be used to represent priority or importance of the meeting.

In another example of the present invention, the third dimension comprises a simulated screen depth, and the fourth dimension comprises a graphical depiction within the data icon. The third dimension may be used to represent the number of attendees at the meeting, and the fourth dimension may represent any other desired factor.

The present invention has the technical advantage of allowing direct user interaction with information contained in icons. The present invention has the further advantage of saving operator and computer time by simplifying the steps necessary to enter and/or edit information. The present invention has the still further advantage of reducing the amount of space which is required for use on a screen during information entry. The present invention has the still further advantage of providing visual indication of various factors that would otherwise require textual explanation.

Although the present invention has been particularly shown and described with reference to a preferred embodiment, it will be understood by those skilled in the art that various changes in form and detail may be made without departing from the spirit and the scope of the invention.

What is claimed is:

1. A method of presenting information contained within a data icon which comprises an interactive hybrid icon/window to a user of a data processing system, comprising the steps of:

storing a plurality of interactive information factors in the data icon on a monitor screen of the data processing system; and automatically varying each of a plurality of dimensions of the data icon with at least three dimensions in order to depict a representation of preselected ones of said information factors, wherein the user is presented with a graphical representation of said preselected factors without a necessity of opening the data icon and wherein a first dimension is varied to depict a time duration, a second dimension is varied to depict relative importance of the data icon as compared to other similar data icons and a third dimension varied to depict a number of attendees required in relation to an event represented by the data icon.

2. A data processing system for graphically presenting information contained within a data icon which comprises an interactive hybrid icon/window to a user of the system, comprising:

means for storing a plurality of interactive information factors in the data icon on a monitor screen of the data processing system; and means for automatically varying each of a plurality of dimensions of the data icon With at least three dimensions in order to depict a representation of preselected ones of said information factors, wherein the user is presented with a graphical representation of said preselected factors without a necessity of opening the data icon and wherein a first dimension is varied to depict a time duration, a second dimension is varied to depict relative importance of the data icon as compared to other similar data icons, and a third dimension varied to depict a number of attendees required in relation to an event represented by the data icon.

* * * * *